United States Patent [19]

Kroyer et al.

[11] 3,811,905

[45] May 21, 1974

[54] AGGREGATE FOR ROAD CONSTRUCTION AND METHOD FOR THE PRODUCTION OF SAID AGGREGATE

[75] Inventors: Karl Kristian Kobs Kroyer, Vestre Kongevej 10; Tage Fredsted, both of Viby J., Denmark

[73] Assignee: said Kroyer, by said Fredsted, a part interest

[22] Filed: June 14, 1972

[21] Appl. No.: 262,673

[30] Foreign Application Priority Data
June 17, 1971 Great Britain................... 28460/71

[52] U.S. Cl.............................. 106/288 B, 106/117
[51] Int. Cl............................................. C08h 17/04
[58] Field of Search................ 106/288 B, 117, 309; 51/295, 307, 308

[56] References Cited
UNITED STATES PATENTS

| | | | |
|---|---|---|---|
| 3,650,714 | 3/1972 | Farkas | 51/295 |
| 3,042,508 | 7/1962 | Haigis et al. | 51/295 |
| 3,503,771 | 3/1970 | Kroyer | 106/288 B |
| 2,764,493 | 9/1956 | Albeit | 106/117 |

FOREIGN PATENTS OR APPLICATIONS

| 981,503 | 5/1962 | Great Britain | 106/117 |
|---|---|---|---|

*Primary Examiner*—Delbert E. Gantz
*Assistant Examiner*—J. V. Howard
Attorney, Agent, or Firm—Watson, Cole, Grindle & Watson

[57] ABSTRACT

An aggregate material for road construction comprising sharp-edged hard particles bonded to the surface of the particles of a basic aggregate by a binder.

7 Claims, No Drawings

AGGREGATE FOR ROAD CONSTRUCTION AND METHOD FOR THE PRODUCTION OF SAID AGGREGATE

BACKGROUND OF THE INVENTION.

It is well known to use natural or artificial aggregates in road surfacings in order to improve the wear-resistance, the light-reflecting properties and the skid-resistance of the road surfaces.

A white, artificial aggregate with good wear and light-reflecting properties has been marketed for a number of years. It consists of grains of devitrified glass. The material and a process for its production are described in British Pat. Specification No. 897.125. The material is sold under the trade name SYNOPAL (registered trade mark). Although the skid-resistance of this aggregate is as good as, or even superior to other well known aggregates, and thus suitable for use in the construction of almost any type of road, in some countries it has failed to comply with the specifications for aggregates for motor ways and roads with so-called high accident locations, e.g. road crossings, especially with respect to P.S.V. figures determined according to British Standard 812:1967.

Slags obtained from metal-extraction processes, especially blast-furnace slag, is another example of a well known material for use as an aggregate material for road surfacings. Although such material is cheap and available in nearly unlimited quantities its use in road surfacings have sometimes been objected to because of its dark color and its tendency to become polished.

In order to obtain a high skid-resistance of a road surface and to reduce the tendency of polishing it has been attempted to use grits of a special calcined bauxite in a suitable binder, e.g., epoxy resin or bitumen. However, the use of calcined bauxite involves some disadvantages. Firstly, calcined bauxite is relatively expensive and as the availability of the material in the sizes required for road construction (usually about 10 mm) is limited, the result is that the price of calcined bauxite for road building is 10–20 times higher than that of other natural and artificial road aggregates. Secondly, the crushing strength of calcined bauxite is relatively low, and the light-reflecting properties are poor because its colour varies from grey to black. The limited availability of coarse grits of calcined bauxite has resulted in the use of bauxite grits having a particle size of 1–3 mm but the use of such particles increases the risk of aqua-planing of high speed motor vehicles.

The object of the present invention is to provide an improved aggregate for road surfacings which aggregate does not suffer from the aforementioned drawbacks and possesses excellent light-reflecting, anti-skid, strength and anti-polishing properties.

SUMMARY OF THE INVENTION

The aggregate of the invention is characterized by the fact that it comprises hard particles having sharp edges, said hard particles being bonded to the surface of a basic aggregate.

Natural and artificial aggregates having vesicular surface structure, e.g., blast-furnace slags and SYNOPAL are preferred basic aggregates. In a preferred embodiment of the invention the vesicles in the surface, which are mainly of the size of 0.1 – 5 mm, are filled with hard particles, which are bonded to each other and to the walls of the vesicles. Thus, the hard particles are protected from wear and removal and are more firmly held by the binder than if they were bonded to a smooth surface. The vesicles thus contain a "reservoir" of hard particles and consequently the aggregates maintain their anti-polishing properties for long periods of time. The basic aggregates are preferably of the sizes normally used in road surfacing, i.e., 2–20 mm.

Examples of the above mentioned hard particles are quarts sand, corundum, silicone carbide, calcined bauxite, devitrified glass (SYNOPAL) and mixtures thereof. The particles to be used according to the invention should have a hardness, e.g., measured on Moh's scale or by their Knoop numbers, above or equal to the hardness of the basic aggregate. When the basic aggregate has a dark color, e.g., blast-furnace slags, the hard particles bonded thereto are preferably white or light coloured in order to give the aggregate light-reflecting properties. When the basic aggregate is white, dark colored hard particles may be added without severely impairing the light-reflecting properties. Thus, if blast-furnace slags are used as the basic aggregate, SYNOPAL may be used as the source of hard particles and vice versa. Hard particles having a size of below 0.5 mm have been found to give the best anti-polishing characteristics, which is a measure of the skid-resistance of a given aggregate. As mentioned above the degree to which a roadstone will polish is measured by its "Polished Stone Value" (P.S.V.) according to British Standard 812:1967.

The binders which serve to bond the hard particles to or into the surface of the basic aggregate are preferably of an inorganic type, because the binder should have a hardness close to the hardness of the basic aggregate and such hardness is not obtainable with resinous binders. Binders of the waterglass type are preferred, because they are easily handled, cheap and give strong bonds between the hard particles and the basic aggregates through a ceramic bond when fired.

The aggregate of the invention preferably consists of 100 parts by weight of grains of a basic aggregate, from 1–10 parts by weight of binder (dry weight) and from 5–30 parts by weight of hard particles.

The aggregate of the invention can be produced either batchwise or continuously. In a batch-process a rotary drum is charged with the basic aggregates. The drum is rotated at a speed of 5–10 r.p.m. and a predetermined amount of binder is added. When the binder is thoroughly distributed over the surface of the aggregates, the desired amount of hard particles is added. In order to prevent the aggregate particles from sticking together a parting agent may be added; also an excessive amount of hard particles may be used. When the hard particles are distributed over the surfaces of the basic aggregate and embedded in the binder, the binder is cured by drying or firing depending on the type of binder used. When waterglass is used as a binder, the aggregate is fired to give a ceramic water-resistant bond.

In a continuous process the basic aggregate is fed into the upper end of a slightly inclined rotary kiln. In passing through the kiln the aggregate first enters a zone where a binder is added in a predetermined amount depending on the rate of feeding of the aggregate. In the following zone the binder is distributed over the surface of the aggregate by the tumbling action of the rotary kiln.

In the following zone the hard particles are added. The aggregates may then be transferred to a second rotary kiln for curing or firing of the binder.

DESCRIPTION OF THE PREFERRED EMBODIMENTS.

EXAMPLE 1

10 kg SYNOPAL grains in the size of 8–12 mm (P.S.V. of 48) were fed into a rotary drum mixer. 0.5 l waterglass of 36° B. was added to the grains. The mixture was tumbled for 10 minutes and a mixture of 0.5 kg calcined bauxite having a particle size of 0.25–0.50 mm and 1.5 kg SYNOPAL having a particle size of below 0.15 mm were added and tumbled for additionally 10 minutes. The aggregate was then transferred to a small rotary kiln and fired at 1,100°C for 10–15 minutes. The P.S.V. of the final aggregate was 60.

EXAMPLE 2

The process of Example 1 was repeated using 10 kg blast-furnace slags having a particle size of 8–12 mm as the basic aggregate (P.S.V.: 50). Waterglass was again used as a binder in an amount of 0.5 l of 36° B. As hard particles 1.0 kg SYNOPAL of a particle size of below 0.15 mm was used. The aggregate was fired at 1,000°C for 10–15 minutes. The final aggregates had a P.S.V. of 63 and possessed excellent light-reflecting properties.

EXAMPLE 3

The process of example 1 was repeated using 10 kg blast-furnace slag having a particle size of between 8 and 12 mm as the basic aggregate (P.S.V.: 50). The binder was 0.5 l of a 36° B. waterglass solution. The hard particles were quarts powder having particle sizes of below 0.09 mm. The composite product was fired at a temperature of about 900°C for 10–15 minutes. The P.S.V. of the final product was 79.

EXAMPLE 4

The process of Example 1 was repeated using a basic aggregate consisting of 25 kg SYNOPAL having a particle size of 8–12 mm (P.S.V.: 48). 2.5 l of a 36° B. waterglass solution were added. After mixing for 10 minutes a further amount of 5 kg SYNOPAL having a particle size of below 0.09 mm were added. The product thus formed was fired at a temperature of 1,050°C. The P.S.V. of the final product was 76.

We claim:

1. An aggregate for road construction, characterized in that it comprises hard particles having sharp edges of a material selected from the group consisting of quartz, corundum, silicon carbide, calcined bauxite, devitrified glass and mixtures of two or more of the foregoing, said hard particles being bonded to the surfaces of particles of a basic aggregate selected from the group consisting of blast furnace slag, devitrified glass and mixtures of the foregoing.

2. An aggregate as in claim 1, characterized in that the hard particles are of a particle size of below 0.5 mm.

3. An aggregate as in claim 1, characterized in that said basic aggregate particles have particle sizes of between 2 and 20 mm.

4. An aggregate as in claim 1, characterized in that the hard particles are bonded to the surface of the basic aggregate by a binder.

5. An aggregate as in claim 4, characterized in that the binder is waterglass.

6. A method for the production of the aggregate of claim 1, characterized by the steps of
   1. mixing particles of a basic aggregate selected from the group consisting of blast furnace slag, devitrified glass and mixtures of the foregoing with a binder to form a coating of binder on the surface of said particles,
   2. adding hard particles of a material selected from the group consisting of quartz, corundum, silicon carbide, calcined bauxite, devitrified glass and mixtures of two or more of the foregoing to the coated basic aggregate particles to embed the hard particles in said coating and
   3. curing the binder to firmly bond the hard particles to the surface of said basic aggregate particles.

7. A method as in claim 6, characterized in using a waterglass solution as binder and in firing the coated basic aggregate particles having hard particles embedded in said coating to cure the binder.

* * * * *